(12) United States Patent
Gordy

(10) Patent No.: US 8,266,981 B2
(45) Date of Patent: Sep. 18, 2012

(54) CONDUIT END FITTING WITH INTEGRATED GUIDE TUBE FOR A PUSH-PULL CABLE ASSEMBLY

(75) Inventor: Donald Gene Gordy, Moberly, MO (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 1166 days.

(21) Appl. No.: 11/923,112

(22) Filed: Oct. 24, 2007

(65) Prior Publication Data

US 2009/0107285 A1    Apr. 30, 2009

(51) Int. Cl.
   *F16C 1/10*    (2006.01)
(52) U.S. Cl. .................. 74/502.4; 74/500.5; 74/501.5 R
(58) Field of Classification Search ...... 74/502.4–502.6; 29/434; 403/325
   See application file for complete search history.

(56) References Cited

U.S. PATENT DOCUMENTS

| | | | |
|---|---|---|---|
| 3,386,310 A * | 6/1968 | Haddad ........................ | 74/502.4 |
| 3,427,894 A * | 2/1969 | Tschanz ....................... | 74/502.4 |
| 3,916,723 A * | 11/1975 | Hawtree et al. ............. | 74/502.4 |
| 3,990,321 A * | 11/1976 | Hurlow ........................ | 74/502.3 |
| 4,238,974 A | 12/1980 | Fawcett | |
| 4,294,133 A | 10/1981 | Hurley | |
| 4,649,010 A | 3/1987 | Bennett et al. | |
| 4,773,279 A * | 9/1988 | Spease et al. ................ | 74/502.4 |
| 5,003,838 A * | 4/1991 | Pospisil et al. .............. | 74/502.4 |
| 5,207,602 A * | 5/1993 | McMills et al. ............. | 439/836 |
| 5,582,074 A * | 12/1996 | Kelley et al. ................ | 74/502.4 |
| 5,653,147 A * | 8/1997 | Kelley et al. ................ | 74/502.4 |
| 5,862,580 A | 1/1999 | Petruccello et al. | |
| 5,933,557 A | 8/1999 | Ott | |
| 6,119,543 A | 9/2000 | Webb | |
| 6,185,806 B1 * | 2/2001 | Malone et al. ................. | 29/434 |
| 6,698,967 B2 | 3/2004 | Henrich et al. | |
| 6,926,669 B1 * | 8/2005 | Stewart et al. ............... | 600/439 |

* cited by examiner

*Primary Examiner* — Vinh Luong
(74) *Attorney, Agent, or Firm* — Porter Wright Morris & Arthur LLP; Richard M. Mescher; Dean B. Watson

(57) ABSTRACT

A motion transmitting cable assembly includes a cable having a conduit and a core longitudinally movable within the conduit, a core attachment secured to an end of the core, and a conduit abutment fitting having a main body secured to an end of the conduit and a guide tube extending from the main body and slidably receiving the core attachment therein. The conduit abutment fitting is formed of plastic and the guide tube is unitary with the main body so that the conduit abutment fitting is a molded plastic one-piece component. The guide tube is bendable so that the core attachment can pivot relative to the main body to account for rotational motion of the control member. The guide tube is preferably bendable at least 7 degrees in all directions with a bending force of no more than 4.5 N.

18 Claims, 4 Drawing Sheets

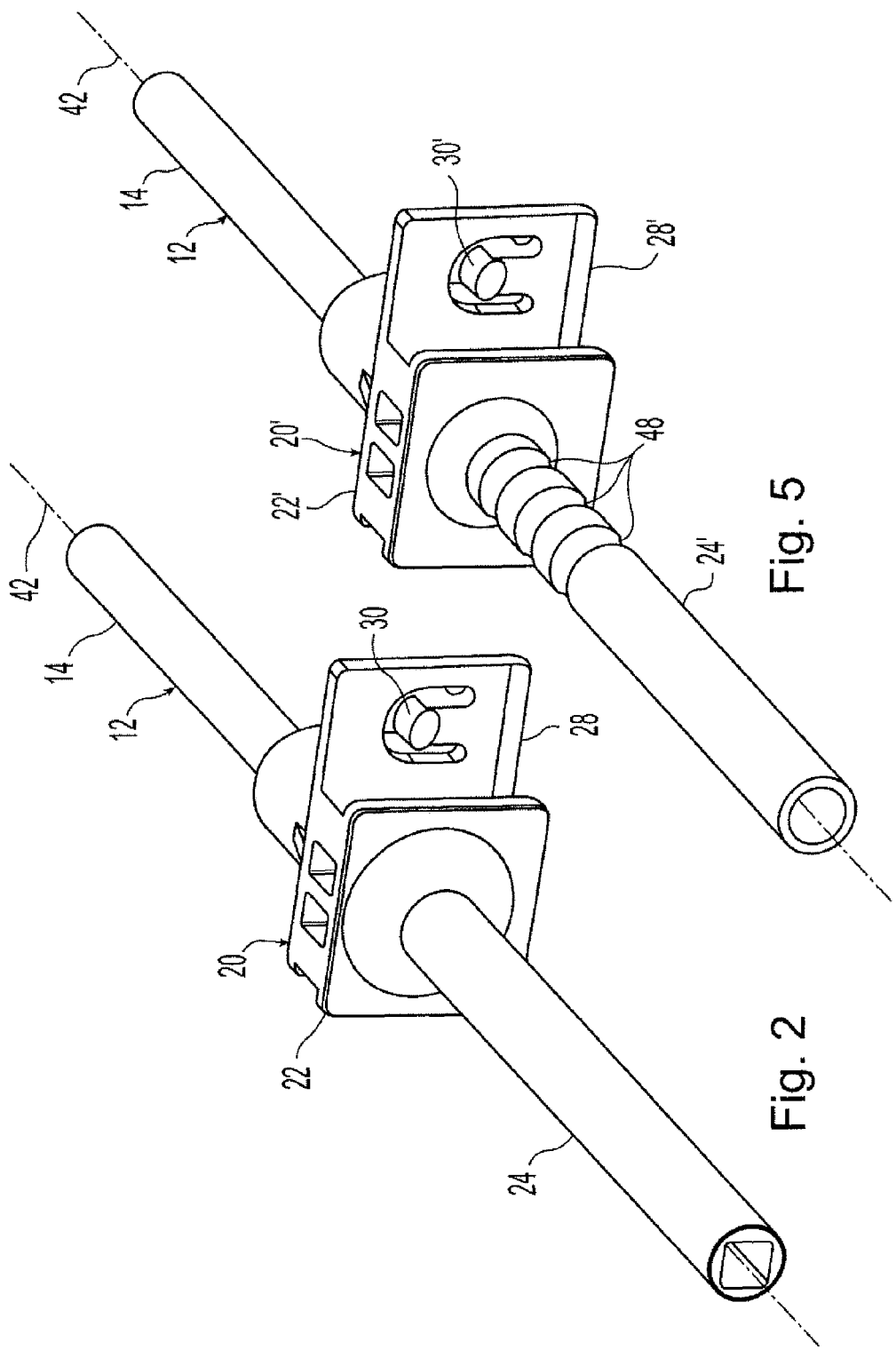

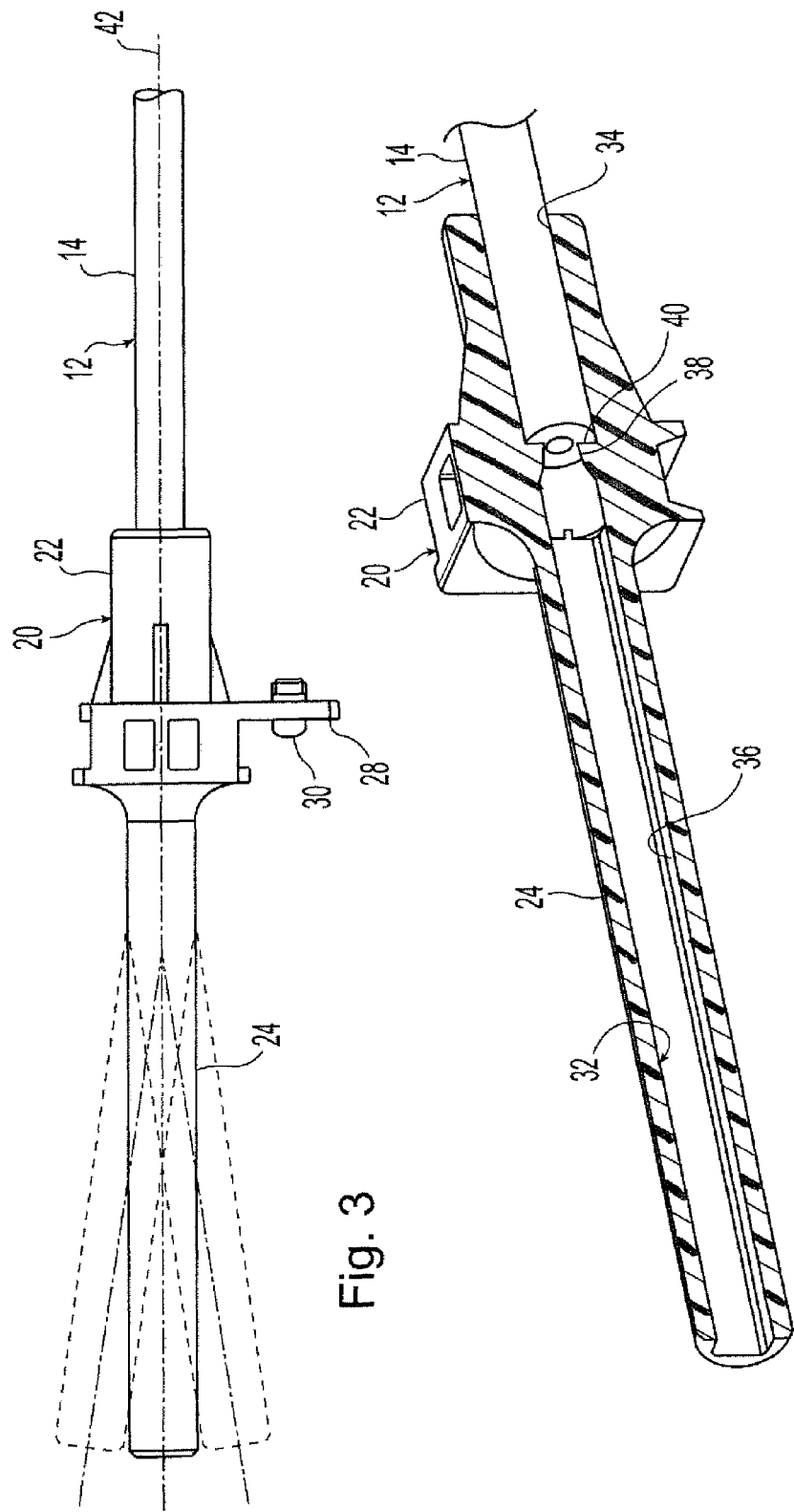

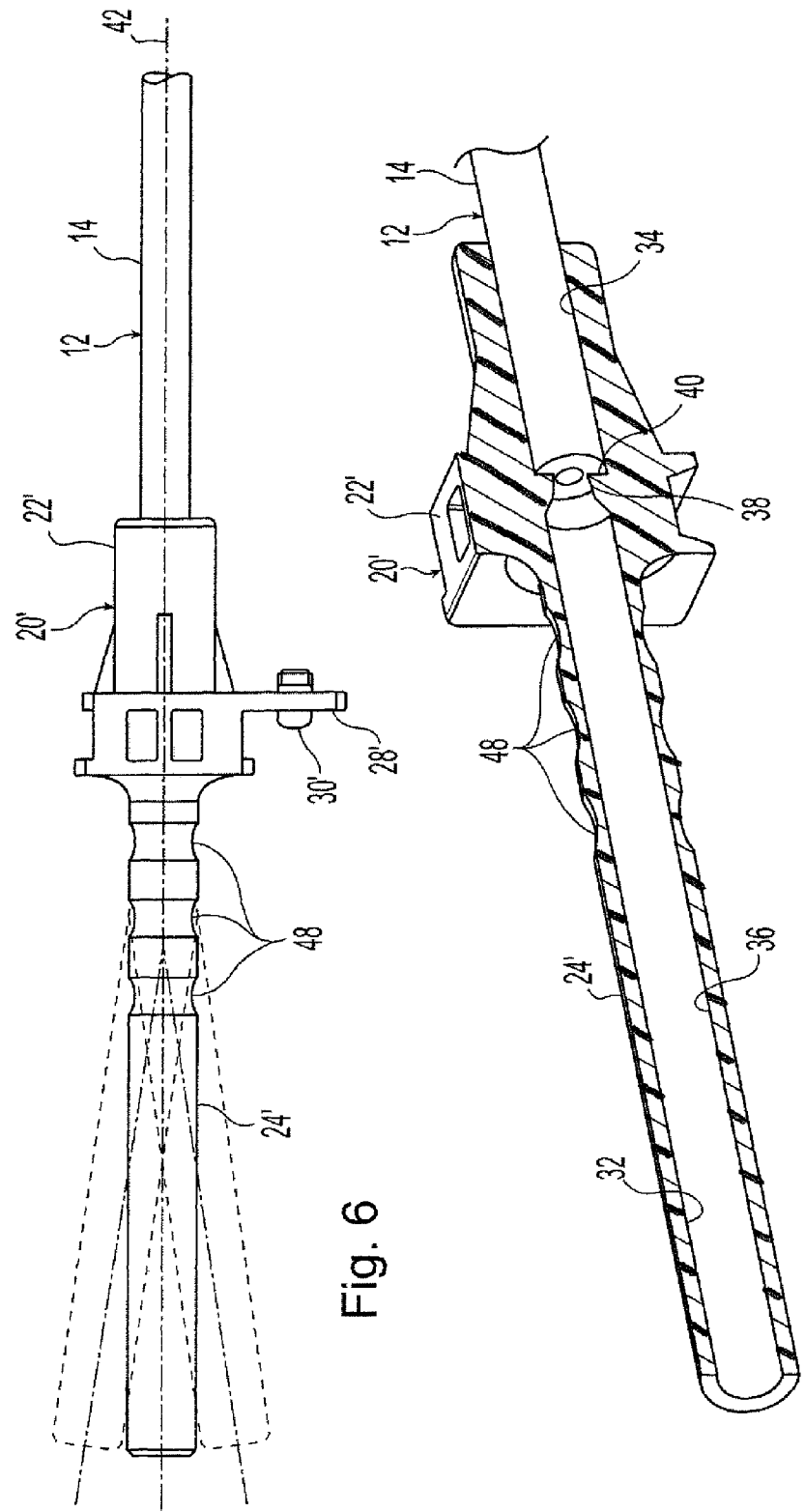

CONDUIT END FITTING WITH INTEGRATED GUIDE TUBE FOR A PUSH-PULL CABLE ASSEMBLY

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the invention generally relates to motion-transmitting cable assemblies and, more particularly, to such assemblies having a core attachment slidable within a guide tube.

BACKGROUND OF THE INVENTION

Motion-transmitting control cable assemblies, sometimes referred to as "Bowden cables" or "push-pull cables," are used for transmitting both force and travel along a path in aircraft, automotive, and marine environments. These cable assemblies can be used for transmitting force and motion in push/pull type applications. One example of a specific use of such remote control cable assemblies is positioning automatic transmission shift members in automobiles.

A motion-transmitting remote control cable assembly typically includes a flexible core slidably enclosed within a flexible outer sheath or conduit. The core is adapted at one end to be attached to a member to be controlled whereas the other end is attached to an actuator for longitudinally moving the core element within the outer sheath. The ends of the outer sheath are secured by conduit abutment fittings to support structures or abutment members. Typically, steel rods are crimped to ends of the core. Each steel rod typically has an over-molded terminal on the end of the rod which can be connected to the control member and the actuator. The rod end or core attachment is typically slidably received in a guide tube pivotably secured to the conduit abutment fitting with the core meeting the steel rod within the guide tube. The pivotable connection between the guide tube and the conduit abutment fitting must meet required pull-out loads resulting in relatively heavy and expensive assemblies.

In the automobile industry, there is a never ending desire to simplify and/or speed up the assembly process. There is also a never ending desire to reduce cost and weight of components without negatively affecting performance. Accordingly, there is a need in the art for an improved control cable assembly.

SUMMARY OF THE INVENTION

The present invention provides a control cable assembly which addresses at least some of the above-noted problems of the related art. According one embodiment of the present invention, a motion transmitting cable assembly comprises, in combination, a cable having a conduit and a core longitudinally movable within the conduit, a core attachment secured to an end of the core, and a conduit abutment fitting having a main body secured to an end of the conduit and a guide tube extending from the main body and slidably receiving the core attachment therein. The guide tube is unitary with the main body so that the conduit abutment fitting is a unitary one-piece component. The guide tube is bendable so that the core attachment can pivot relative to the main body to account for rotational motion of the control member.

According to another embodiment of the present invention, a motion transmitting cable assembly comprises, in combination, a cable having a conduit and a core longitudinally movable within the conduit, a core attachment secured to an end of the core, and a conduit abutment fitting having a main body secured to an end of the conduit and a guide tube extending from the main body and slidably receiving the core attachment therein. The guide tube is unitary with the main body so that the conduit abutment fitting is a unitary one-piece component. The guide tube is bendable so that the core attachment can pivot relative to the main body to account for rotational motion of the control member. At least a portion of the guide tube is shaped to increase flexibility of the guide tube for bending.

According to yet another embodiment of the present invention, a motion transmitting cable assembly comprises, in combination, a cable having a conduit and a core longitudinally movable within the conduit, a core attachment secured to an end of the core, and a conduit abutment fitting having a main body secured to an end of the conduit and a guide tube extending from the main body and slidably receiving the core attachment therein. The conduit abutment fitting comprises plastic and the guide tube is unitary with the main body so that the conduit abutment fitting is molded plastic one-piece component. The guide tube is bendable so that the core attachment can pivot relative to the main body to account for rotational motion of the control member. The guide tube is bendable at least 7 degrees in all directions with a bending force of no more than 4.5 N.

From the foregoing disclosure and the following more detailed description of various preferred embodiments it will be apparent to those skilled in the art that the present invention provides a significant advance in the technology of control cable assemblies. Particularly, the invention provides an easily manufactured, low cost and low weight conduit abutment fitting which performance requirements and reduces assembly time. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a perspective view of a conduit abutment fitting located at a first end of the conduit of the cable assembly of FIG. 1;

FIG. 3 is a top plan view of the conduit abutment fitting of FIG. 2;

FIG. 4 is a perspective view, in cross-section taken along a vertical plane at a central longitudinal axis, of the conduit abutment fitting of FIGS. 2 and 3;

FIG. 5 is a perspective view of a conduit abutment fitting located at the second end of the conduit of the cable assembly of FIG. 1;

FIG. 6 is a top plan view of the conduit abutment fitting of FIG. 5; and

FIG. 7 is a perspective view, in cross-section taken along a vertical plane at a central longitudinal axis, of the conduit abutment fitting of FIGS. 5 and 6.

Figure 1:
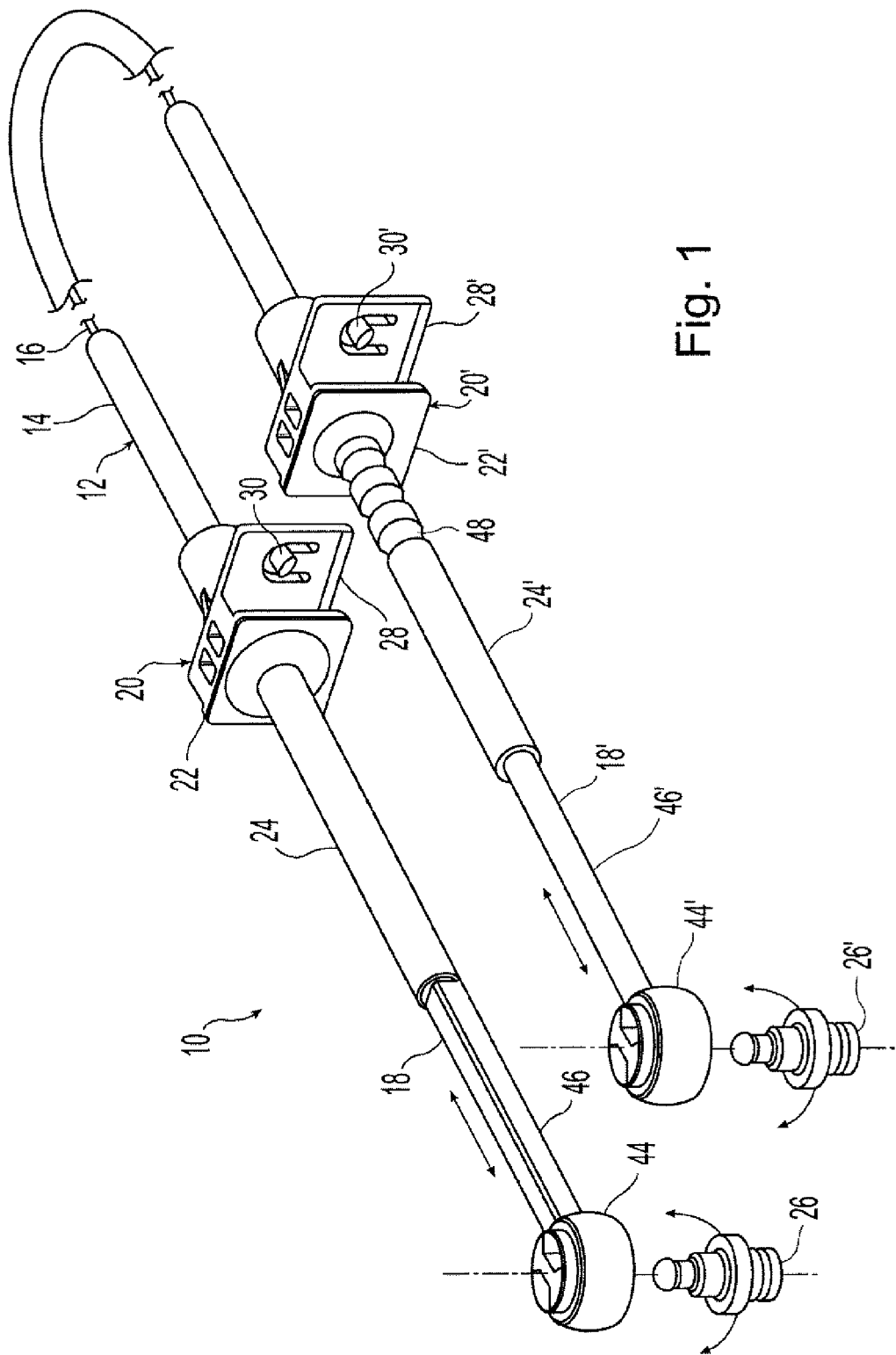
FIG. 1 is a perspective view of a push-pull cable assembly according a preferred embodiment of the present invention.

It should be understood that the appended drawings are not necessarily to scale, presenting a somewhat simplified representation of various preferred features illustrative of the basic principles of the invention. The specific design features of the cable assembly as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the cable assemblies illustrated in the drawings. In general, up or upward refers to an upward direction generally in the plane of the paper in FIG. 1 and down or downward refers to a downward direction generally in the plane of the paper in FIG. 1. Also in general, fore or forward refers to a direction generally toward the left in the plane of the paper in FIG. 1, that is, toward the end of the cable core, and aft or rearward refers to a direction generally toward the right in the plane of the paper in FIG. 1, that is, away from the end of the cable core.

DETAILED DESCRIPTION OF CERTAIN PREFERRED EMBODIMENTS

It will be apparent to those skilled in the art, that is, to those who have knowledge or experience in this area of technology, that many uses and design variations are possible for the motion-transmitting control cable assemblies disclosed herein. The following detailed discussion of various alternative and preferred embodiments will illustrate the general principles of the invention with reference to a push-pull cable assembly for use with a motor vehicle shifter/transmission system. Other embodiments suitable for other applications will be apparent to those skilled in the art given the benefit of this disclosure.

The term "snap-fit" or "snap-lock" is used herein and in the claims to mean a connection between at least two components wherein at least one of the components has a protrusion and/or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" is used herein and in the claims to mean a member made of a single continuous material, such as, for example a molded or co-molded component.

Referring now to the drawings, FIG. 1 shows a push-pull cable assembly 10 according to a preferred embodiment of the present invention which connects a transmission assembly to a shifter assembly of a motor vehicle, such as an automobile. While the illustrated embodiments of the present invention are particularly adapted for use with an automobile, it is noted that the present invention can be utilized with any motor vehicle having a control cable including trucks, buses, vans, recreational vehicles, earth moving equipment and the like, off road vehicles such as dune buggies and the like, air borne vehicles, and water borne vehicles. While the illustrated embodiments of the present invention are particularly adapted for use with a transmission system, it is also noted that the present invention can be utilized with other motor vehicle systems such as, for example, a parking brake, accelerator, hood release, brake release, trunk release, park lock, tilt wheel control, fuel filler door, and/or hydraulic control cables.

As best shown in FIG. 1, the illustrated motion transmitting cable assembly 10 includes a push/pull cable 12 having a flexible outer sheath or conduit 14 and a flexible inner core 16 longitudinally slidable within the conduit 14, first and second core attachments 18, 18' secured to ends of the core 16, and first and second conduit abutment fittings or end fittings 20, 20' secured to ends of the conduit 14.

In automotive push-pull applications, the conduit 14 typically includes an interior thermoplastic tube or liner. The liner forms the inside diameter or passage of the conduit 14. Exterior to the liner, a reinforcing element, such as a plurality of metal wires helically wrapped about the liner, is typically provided to add strength to the thermoplastic liner. The reinforcing element gives added strength for the compression and tension loads seen in push-pull applications. After the reinforcing element is applied about the liner, an outer coating or jacket of flexible thermoplastic material is typically applied to hold the reinforcement member in relation to the liner and fully encapsulate the sub-assembly. The outer coating is typically applied through a high temperature extrusion process. Through extrusion, an outside diameter is formed around the sub-assembly and the conduit 14 can be cut to a desired length. It is noted that the conduit 14 can have any other suitable construction and/or can comprise any other suitable materials within the scope of the present invention. For example, the conduit 14 can be constructed to eliminate the use of metal so that the conduit 14 is constructed entirely of non-metallic materials.

The core 16 typically consists of a strand assembly made up of metal wire. The metal wires are wound in different configurations depending upon the application. In automotive push-pull applications, the core 16 typically has a center wire or a small wire bundle. To strengthen the center wire, a reinforcing element is provided such as, for example, a plurality of outer wires or wire bundles, helically wound around the center wire. As with the reinforcing element for the conduit liner, the reinforcing element for the core 16 provides support for the center wire. It is noted that the core 16 can have any other suitable construction and/or can comprise any other suitable materials within the scope of the present invention. For example, the core 16 can be constructed to eliminate the use of metal so that the core 16 is constructed entirely of non-metallic materials.

A first open end of the conduit 14 is secured to the first conduit abutment fitting 20. The illustrated first conduit abutment fitting 20 includes a main body 22 and a guide tube 24 which extends from the forward end of the main body 22. A first end of the core 16 extends longitudinally out of the first open end of the conduit 14 and partially through the first conduit abutment fitting 20 and is rigidly connected to the first core attachment 18 within the guide tube 24. The first core attachment 18 is slidably received within the guide tube 24 for sliding longitudinal movement therein so that first core attachment 18 is moved along a linear path. The illustrated first core attachment 18 is adapted to be operatively connected to a first connection pin 26 of control member such as, for example, a transmission lever. The illustrated connection pin 26 has rotational motion, that is, the connection pin moves along an arcuate path. It is noted that the core attachment 18 can alternatively be adapted to be connected to the control member 26 in any other suitable manner and/or to any other suitable type of control member.

A second open end of the conduit 14 is secured to the second conduit abutment fitting 20' and the second end of the core 16 is rigidly connected to the second core attachment 18' within the guide tube 24' of the second conduit abutment fitting 20'. The illustrated second core attachment 18' is adapted to be operatively connected to a second connection pin 26' of second control member such as, for example, a shifter lever. The illustrated second connection pin 26' has rotational motion, that is, the connection pin 26' moves along an arcuate path. It is noted that the second core attachment 18' can alternatively be adapted to be connected to the control member 26' in any other suitable manner and/or to any other suitable type of control member.

In operation, movement of the shifter lever by the operator moves the second core attachment 18' to push or pull the core 16. The longitudinal movement of the core 16 within the conduit 14 pushes or pulls the first core attachment 18 to operate the transmission lever to change gears in a desired manner. The core attachments 18, 18' longitudinally move within the guide tubes 24, 24' to define a linear line of force as the core attachments 18, 18' are actuated to axially move within the guide tubes 24, 24'. Thus, longitudinal movement of the core 16 and the core attachments 18, 18' actuates the control members 26, 26'. The flexible conduit and core 14, 16 allow the cable 12 to be routed along a desired path, which is typically not linear. The illustrated guide tubes 24, 24' are bendable to allow the orientation of the core attachments 18, 18' relative to the conduit abutment fittings 20, 20' to account for rotational motion of the control members 26' 26'.

As best shown in FIGS. 2 to 4, the illustrated first conduit abutment fitting 20 includes the main body 22 and the guide tube 24 forwardly extending from the main body 22. The illustrated main body 22 is adapted to be secured to a stationary mounting bracket to form a stationary location for the first end of the conduit 14. The illustrated main body 22 has a mounting flange 28 having a snap-lock connector 30 for quickly and removably securing the man body 22 to the mounting bracket. It is noted that the conduit abutment fitting 20 can alternatively have any other suitable type of securement means depending of the requirements of the application. The illustrated conduit abutment fitting 20 forms a central passage 32 having a first or rear portion 34 sized and shaped for closely receiving the end of the conduit 14, a second or forward portion 36 sized and shaped for closely receiving the core attachment 18, and a third or intermediate portion 38 connecting the first and second portions 34, 36. The third portion 38 is sized smaller than the first portion 34 to form an abutment 40 engaged by the end of the conduit 14.

The illustrated guide tube 24 is formed as a unitary one-piece component with the main body 22. Preferably, the conduit abutment fitting 20 is a one-piece component molded of plastic. It is noted, however, that the conduit abutment fitting 20 can comprise other materials and/or can be formed in other manners.

Because the ends of the illustrated cable assembly 10 are substantially the same with respect to the remaining description, only the first end will be described in detail hereinafter.

The illustrated guide tube 24 is generally tubular-shaped having a generally cylindrical-shaped outer surface and the longitudinally extending second portion 36 of the central passage 32 extending there through. The illustrated guide tube 24 is bendable so that the core attachment 18 can pivot relative to the main body 22 to account for rotational motion of the control member. At least a portion of the guide tube 24 has enough flexibility to permit the bending of the guide tube 24. The illustrated guide tube 24 is bendable in all directions so that the core attachment 18 can pivot relative to the main body 22 in each axis perpendicular to a longitudinal axis 42 of the conduit abutment fitting 20. The guide tube 24 preferably can bend an angle of at least 7 degrees in all directions with an articulation force of no more than 4.5 N.

As best shown in FIG. 1, the illustrated core attachment 18 includes a terminal 44 and a rod 46 rearward extending from the terminal 44 and secured to the core 16. The terminal 44 is adapted to receive the connecting pin 26 as is known in the art. The illustrated rod 46 is elongate and rearwardly extends from the terminal 44. The rod 46 is sized and shaped to be slidingly received within the forward portion 36 of the passage 32. The illustrated rod 46 is generally square in cross-section to cooperate with the illustrated second portion 36 of the passage 32 which is also generally square in cross-section. Such a non-circular cross-section can be advantageous when improved strength is desired and/or it is desired to limit rotational movement of the rod 46 within the guide tube 24. It is noted that the rod 46 and passage 36 can alternatively have any other suitable shape.

The terminal and rod 44, 46 can be constructed as separate components and secured together. For example, the rod 46 can be formed of metal rod and the terminal 44 can be formed of a plastic material over-molded onto the forward end of the rod 46. Alternatively, the terminal and rod 42, 44 can be formed of unitary or one-piece, construction and molded of a plastic material but any other suitable material can be alternatively utilized. For example, see U.S. patent application Ser. No. 11/849,700 filed on Sep. 4, 2007, the disclosure of which is expressly incorporated herein in its entirety.

The core 16 extends out of the conduit 18 and through the intermediate portion 38 of the passage 32 and into the forward portion 36 of the passage 32 where the core 16 is secured to the rear end of the core attachment rod 46 within the guide tube 24. The core 16 can be secured to the rod 46 in any suitable manner. For example, the rod 46 can be crimped to the core 16 when the rod 46 is formed of metal. The first core attachment 18 (which is the transmission end outside the vehicle) is preferably adapted to withstand a tension load of at least 667 N at 149 degrees C. and compression load of at least 338.8 N at 149 degrees C. The second core attachment 18' (which is the shifter end inside the vehicle) is preferably adapted to withstand a tension load of at least 667 N at 82 degrees C. and compression load of at least 338.8 N at 82 degrees C.

FIGS. 5 to 7 show the illustrated second conduit abutment fitting 20'. The second conduit abutment fitting 20' is substantially the same as the first conduit abutment fitting 20 described hereinabove except that the forward portion 36' of the passage 32' is circular shaped in cross-section to cooperate with the rod 46' having a circular shape in cross-section and a portion of the guide tube 24' is shaped to increase flexibility for bending. The illustrated guide tube 24' has a plurality of thinned wall sections 48 to increase flexibility of the guide tube 24' for bending. While the illustrated guide tube 24' has three thinned wall sections 48, one or more thinned wall sections 48 can be utilized. The illustrated thinned wall sections 48 are formed by a plurality of longitudinally spaced apart and circumferentially extending grooves. It is noted that the thinned wall sections 48 can alternatively be formed or shaped in any other suitable manner. It is also noted that the guide tube 24' can alternatively be formed and/or shaped in any other suitable manner to increase flexibility for bending such as, for example, corrugations, living hinges, openings, co-molding a section of more flexible material, or the like.

It is noted that the various features of the illustrated embodiments of the invention can be used in any combination. For example, a guide tube having a non-circular-shaped passage can have thinned walled sections and a guide tube having a circular-shaped passage can be without thinned wall sections.

It is apparent from the foregoing disclosure that the cable assemblies according to the present invention reduce cost by eliminating costly connections, such as ball and socket type connections, which where hereto fore used to account for rotational motion of the control member. Additionally, the cable assemblies of the present invention reduce the number of components required and reduce the number of assembly steps.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A motion transmitting cable assembly, said motion transmitting cable assembly comprising, in combination:
   a cable having a conduit and a core longitudinally movable within the conduit;
   a core attachment secured to an end of the core;
   a conduit abutment fitting having a main body secured to an end of the conduit and a guide tube extending from the main body and slidably receiving the core attachment therein;
   wherein the guide tube is unitary with the main body so that the conduit abutment fitting is a unitary one-piece component;
   wherein a portion of the guide tube between the main body and the core attachment resiliently bends when the core attachment pivots relative to the main body;
   wherein the portion of the guide tube resiliently bends in all directions as the core attachment pivots relative to the main body in each axis perpendicular to a longitudinal axis of the conduit abutment fitting;
   wherein the portion of the guide tube that resiliently bends in each axis perpendicular to the longitudinal axis of the conduit abutment fitting is configured to have a higher flexibility for resiliently bending in each axis perpendicular to the longitudinal axis than another portion of the guide tube between the core attachment and an end of the guide tube opposite the main body which defines a linear line of force as the core attachment slides within the guide tube; and
   wherein the guide tube resiliently bends at least 7 degrees with a bending force of no more than 4.5 N.

2. The cable assembly according to claim 1, wherein a passage of the guide tube receiving the core attachment is non-circular in cross-section and the core attachment is non-circular in cross-section.

3. The cable assembly according to claim 2, wherein the passage and the core attachment are each square in cross-section.

4. The cable assembly according to claim 1, wherein a passage of the guide tube receiving the core attachment is circular in cross-section and the core attachment is circular in cross-section.

5. The cable assembly according to claim 1, wherein the guide tube resiliently bends at least 7 degrees in all directions with the bending force of no more than 4.5 N.

6. The cable assembly according to claim 1, wherein the portion of the guide tube that resiliently bends is shaped to increase flexibility of the guide tube for bending in each axis perpendicular to the longitudinal axis.

7. The cable assembly according to claim 1, wherein the portion of the guide tube that resiliently bends has a wall section with a thickness less than adjacent wall sections to increase flexibility of the guide tube for resiliently bending in each axis perpendicular to the longitudinal axis.

8. The cable assembly according to claim 1, wherein the portion of the guide tube that resiliently bends is provided with a circumferentially extending groove encircling the longitudinal axis to increase flexibility of the guide tube for resiliently bending in each axis perpendicular to the longitudinal axis.

9. The cable assembly according to claim 1, wherein the portion of the guide tube that resiliently bends is provided with a plurality of longitudinally spaced apart and circumferentially extending grooves each encircling the longitudinal axis to increase flexibility of the guide tube for resiliently bending in each axis perpendicular to the longitudinal axis.

10. A motion transmitting cable assembly, said motion transmitting cable assembly comprising, in combination:
    a cable having a conduit and a core longitudinally movable within the conduit;
    a core attachment secured to an end of the core;
    a conduit abutment fitting having a main body secured to an end of the conduit and a guide tube extending from the main body and slidably receiving the core attachment therein;
    wherein main body and the guide tube each comprise plastic;
    wherein the guide tube is unitary with the main body so that the conduit abutment fitting is a unitary one-piece component;
    wherein a portion of the guide tube between the main body and the core attachment resiliently bends when the core attachment pivots relative to the main body;
    wherein the portion of the guide tube resiliently bends in all directions as the core attachment pivots relative to the main body in each axis perpendicular to a longitudinal axis of the conduit abutment fitting;
    wherein the portion of the guide tube that resiliently bends in each axis perpendicular to the longitudinal axis of the conduit abutment fitting is shaped to have a higher flexibility for resiliently bending in each axis perpendicular to the longitudinal axis than another portion of the guide tube between the core attachment and an end of the guide tube opposite the main body which defines a linear line of force as the core attachment slides within the guide tube; and
    wherein the guide tube resiliently bends at least 7 degrees with a bending force of no more than 4.5 N.

11. The cable assembly according to claim 10, wherein a passage of the guide tube receiving the core attachment is non-circular in cross-section and the core attachment is non-circular in cross-section.

12. The cable assembly according to claim 10, wherein the passage and the core attachment are each square in cross-section.

13. The cable assembly according to claim 10, a passage of the guide tube receiving the core attachment is circular in cross-section and the core attachment is circular in cross-section.

14. The cable assembly according to claim 10, wherein the guide tube resiliently bends at least 7 degrees in all directions with the bending force of no more than 4.5 N.

15. The cable assembly according to claim 10, wherein the portion of the guide tube that resiliently bends has a wall section with a thickness less than adjacent sections to increase flexibility of the guide tube for resiliently bending in each axis perpendicular to the longitudinal axis.

16. The cable assembly according to claim 10, wherein the portion of the guide tube that resiliently bends is provided with a circumferentially extending groove encircling the longitudinal axis to increase flexibility of the guide tube for resiliently bending in each axis perpendicular to the longitudinal axis.

17. The cable assembly according to claim 10, wherein the portion of the guide tube that resiliently bends is provided with a plurality of longitudinally spaced apart and circumferentially extending grooves each encircling the longitudinal axis to increase flexibility of the guide tube for resiliently bending in each axis perpendicular to the longitudinal axis.

18. A motion transmitting cable assembly, said motion transmitting cable assembly comprising, in combination:
   a cable having a conduit and a core longitudinally movable within the conduit;
   a core attachment secured to an end of the core;
   a conduit abutment fitting having a main body secured to an end of the conduit and a guide tube extending from the main body and slidably receiving the core attachment therein;
   wherein conduit abutment fitting comprises plastic and the guide tube is unitary with the main body so that the conduit abutment fitting is molded plastic one-piece component;
   wherein a portion of the guide tube between the main body and the core attachment resiliently bends when the core attachment pivots relative to the main body;
   wherein the portion of the guide tube resiliently bends in all directions as the core attachment pivots relative to the main body in each axis perpendicular to a longitudinal axis of the conduit abutment fitting;
   wherein the portion of the guide tube that resiliently bends in each axis perpendicular to the longitudinal axis of the conduit abutment fitting is provided with at least one circumferentially extending groove encircling the longitudinal axis to have a higher flexibility for resiliently bending in each axis perpendicular to the longitudinal axis than another portion of the guide tube between the core attachment and an end of the guide tube opposite the main body which defines a linear line of force as the core attachment slides within the guide tube; and
   wherein the guide tube resiliently bends at least 7 degrees in all directions with a bending force of no more than 4.5 N.

* * * * *